(12) United States Patent
Messmer (10) Patent No.: US 8,928,686 B2
(45) Date of Patent: Jan. 6, 2015

(54) TONE AND GAMUT MAPPING METHODS AND APPARATUS

(75) Inventor: Neil W. Messmer, Langley (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 249 days.

(21) Appl. No.: 13/700,074

(22) PCT Filed: May 10, 2011

(86) PCT No.: PCT/US2011/035966
§ 371 (c)(1),
(2), (4) Date: Nov. 26, 2012

(87) PCT Pub. No.: WO2011/156074
PCT Pub. Date: Dec. 15, 2011

(65) Prior Publication Data
US 2013/0076763 A1    Mar. 28, 2013

Related U.S. Application Data (60) Provisional application No. 61/352,444, filed on Jun. 8, 2010.

(51) Int. Cl.
| | | |
|---|---|---|
| G09G 5/02 | (2006.01) | |
| G09G 1/00 | (2006.01) | |
| H04N 1/60 | (2006.01) | |
| H04N 9/67 | (2006.01) | |
| G06K 9/00 | (2006.01) | |

(52) U.S. Cl.
CPC ............. *G09G 1/002* (2013.01); *H04N 1/6058* (2013.01); *H04N 9/67* (2013.01); *G06K 9/00* (2013.01)
USPC ........................................ 345/590

(58) Field of Classification Search
None
See application file for complete search history.

(56) References Cited

U.S. PATENT DOCUMENTS

| | | | |
|---|---|---|---|
| 8,159,500 B1 * | 4/2012 | Bogart et al. ................. | 345/590 |
| 2007/0211272 A1 * | 9/2007 | Kang et al. .................... | 358/1.9 |
| 2007/0223813 A1 | 9/2007 | Segall | |
| 2009/0109233 A1 | 4/2009 | Kerofsky | |

(Continued)

FOREIGN PATENT DOCUMENTS

| | | |
|---|---|---|
| CN | 1523898 | 8/2004 |
| CN | 1694490 | 11/2005 |

(Continued)

OTHER PUBLICATIONS

Stauder, J. et al., "Gamut ID", Visual Media Production 2007. IETCVMP 4th European Conference, Nov. 27-28, 2007. Paris, France.

(Continued)

*Primary Examiner* — Phi Hoang
*Assistant Examiner* — Mohammad H Akhavannik
(74) *Attorney, Agent, or Firm* — John W. Carpenter (57) ABSTRACT

Tone and/or gamut mapping apparatus and methods may be applied to map color values in image data for display on a particular display or other downstream device. A mapping algorithm may be selected based on location and/or color coordinates for pixel data being mapped. The apparatus and methods may be configured to map color coordinates differently depending on whether or not a pixel corresponds to a light source in an image and/or has special or reserved color values.

22 Claims, 7 Drawing Sheets

(56) References Cited

U.S. PATENT DOCUMENTS

| | | | |
|---|---|---|---|
| 2009/0167671 A1* | 7/2009 | Kerofsky | 345/102 |
| 2009/0257652 A1* | 10/2009 | Liu et al. | 382/167 |
| 2009/0285478 A1 | 11/2009 | Thiebaud | |
| 2011/0064373 A1* | 3/2011 | Doser et al. | 386/201 |

FOREIGN PATENT DOCUMENTS

| | | |
|---|---|---|
| CN | 1874526 | 12/2006 |
| CN | ZL200480042828.8 | 4/2007 |
| CN | 101155252 | 4/2008 |
| CN | 101331515 | 12/2008 |
| CN | 101658024 | 2/2010 |
| JP | 63-316992 | 12/1988 |
| JP | 03-127284 | 5/1991 |
| JP | 06-059353 | 3/1994 |
| JP | 11-341296 | 12/1999 |
| JP | 2001-144986 | 5/2001 |
| JP | 2001-218047 | 8/2001 |
| JP | 2004-21410 | 1/2004 |
| JP | 2004-153554 | 5/2004 |
| KR | 2004-0011760 | 2/2004 |
| WO | 2008/122702 | 10/2008 |
| WO | 2009/126258 | 10/2009 |
| WO | WO 2009126258 A1 * | 10/2009 ... G06T 5/00 |

OTHER PUBLICATIONS

Doser, Ingo. "A New Video Format Ensuring the Color Fidelity from content Creation to the End User", NEM Summit, Sep. 30, 2009. Saint Malo, France.

* cited by examiner

TONE AND GAMUT MAPPING METHODS AND APPARATUS

CROSS REFERENCE TO RELATED APPLICATIONS

This application claims priority to U.S. Provisional Patent Application No. 61/352,444 filed 8 Jun. 2010, hereby incorporated by reference in its entirety.

TECHNICAL FIELD

This invention relates to image processing, image display, and image reproduction. Embodiments of the invention provide methods and apparatus which process image data to transform colors and/or tones for display or reproduction locally or at a downstream device. Some example embodiments are displays configured to receive and process image data and to display processed image data for viewing.

BACKGROUND

Commercial video production typically involves acquiring and editing video sequences. Before being distributed, colors in the video production may be adjusted in a color grading step. Color grading typically involves displaying the video production on a reference display under ideal viewing conditions and adjusting colors and tones in the video production to achieve a desired artistic intent. For example, a person operating color grading apparatus (a 'color grader') may decide to make the mood of a scene gloomy by reducing the brightness of the image. Artistic goals may also be met by making other adjustments, for example, changing the colors of certain displayed objects, changing the overall contrast in the scene, changing the overall brightness of the scene, and the like. The result, when displayed on the reference display, matches the artistic intent of the color grader.

A wide number of alternative display technologies are available commercially. These range from digital cinema displays to television sets which may be based on cathode ray tubes, plasma displays, LED displays, LCD panel displays in which the LCD panel is backlit by various types of backlight systems, and the like. Different displays have different capabilities. For example, some displays may have a broader color gamut than other displays. Some displays may be capable of reproducing a broader range of brightnesses and/or a higher maximum brightness than other displays. The inventors have recognized a need for methods and apparatus capable of transforming image data in a manner which can take advantage of the capabilities of a particular display without compromising the artistic intent represented by the images in the image data.

This need also extends to reproductions of still images by various types of printing, engraving, and other image reproduction technology in which the reproduction technology may have capabilities for reproducing colors and/or tones that are different from those assumed by the image data.

There remains a need for flexible and cost-effective tone and/or gamut mapping apparatus and methods. There is a particular need for such apparatus and methods that may be applied to produce enjoyable images on high quality displays.

SUMMARY

A range of aspects of the invention and example embodiments of the invention are described below and illustrated in the accompanying drawings.

BRIEF DESCRIPTION OF DRAWINGS

The appended drawings illustrate non-limiting example embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1A:
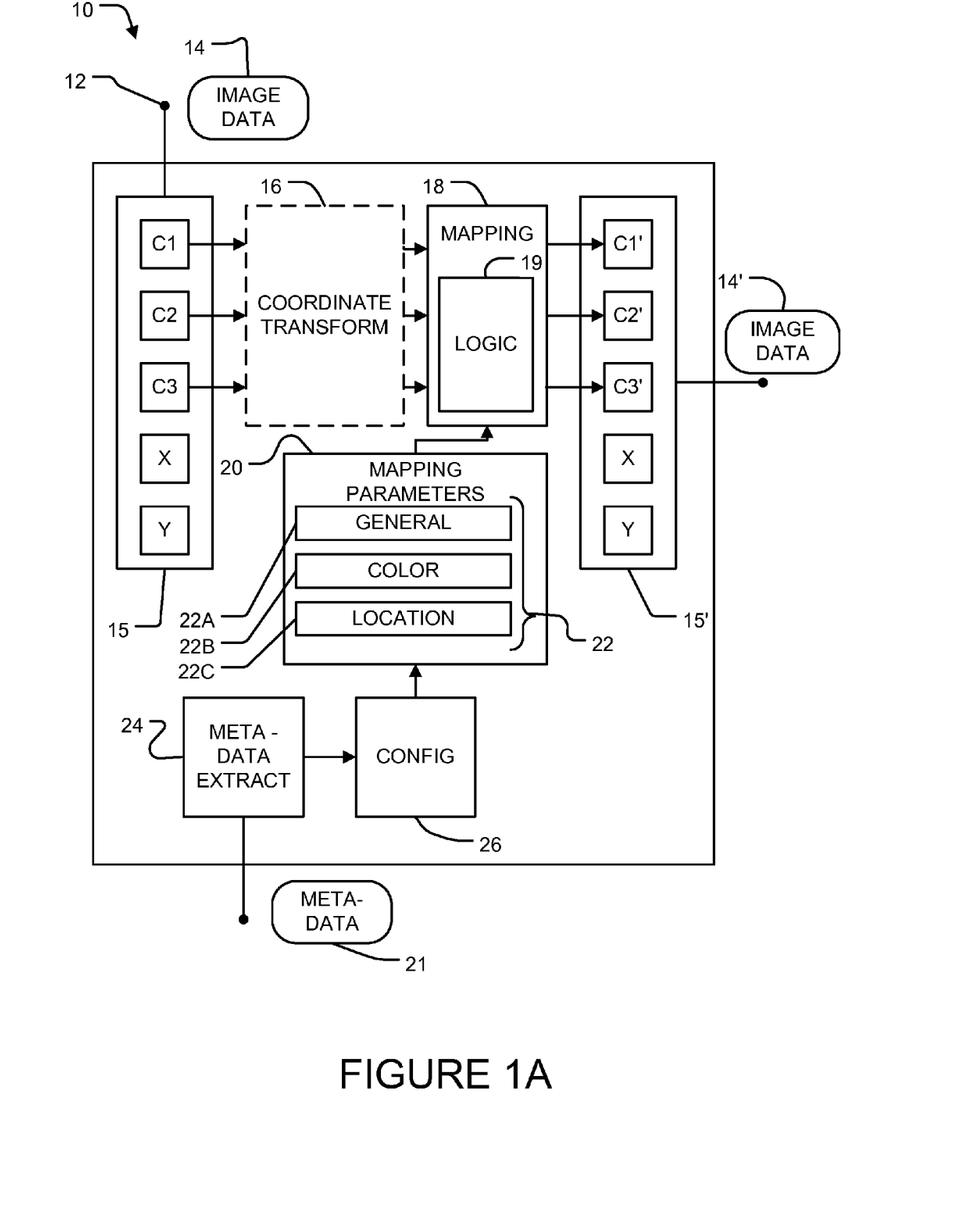
FIG. 1A is a block diagram of components of apparatus according to one example embodiment that may be located at the display end.
Figure 1B:
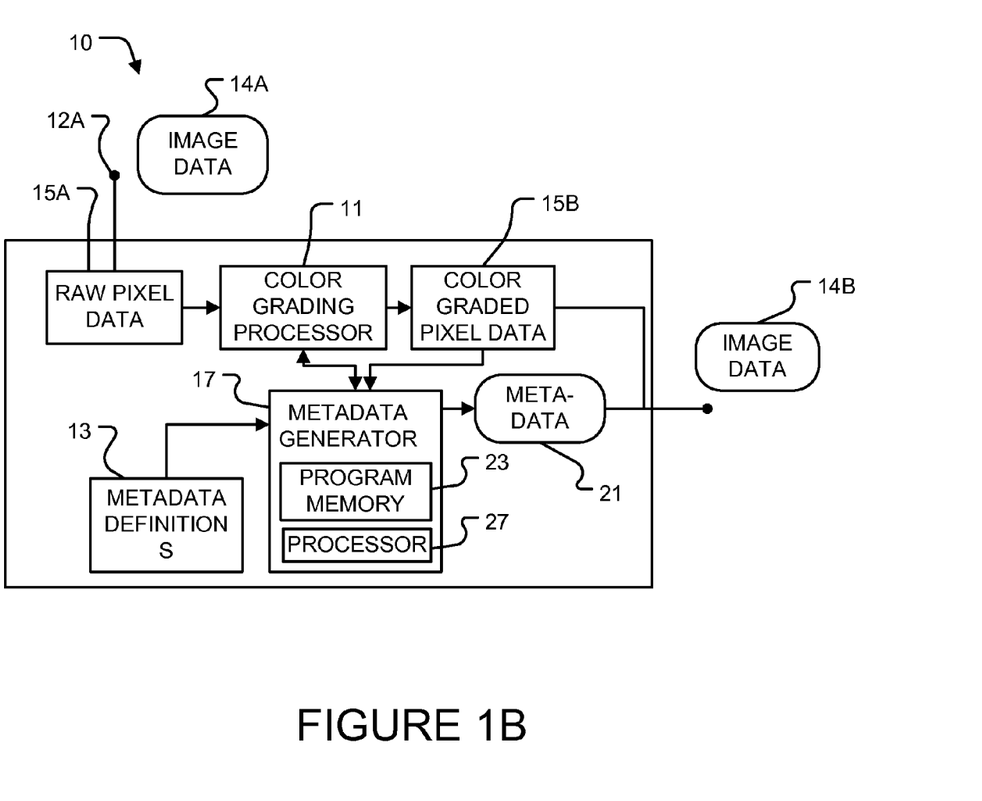
FIG. 1B is a block diagram of components of apparatus according to one example embodiment that may be located at the color grading tool.

FIGS. 1A and 1B are high level block diagrams illustrating a tone and gamut mapping apparatus 10 according to an example embodiment. Components of apparatus 10 (e.g. such as those shown in FIG. 1A) may be located at the display end. Certain other components of apparatus 10 (e.g. such as those shown in FIG. 1B) may be located at a color grading tool, upstream of the display, and may operate with a color grader toolset (e.g. a set of color grading functions provided by the color grading tool) to drive the metadata creation. A color grading tool may comprise, for example, software and/or hardware-based systems operable by a color grader to receive input image data and to adjust colors and/or luminance of pixel data in areas of the input image data to achieve a desired artistic effect for the image.

At the display end, apparatus 10 has an input 12 at which image data 14 is received. Image data 14 may comprise video data, data specifying one or more still images or the like. Input 12 may comprise a physical input, such as a serial or parallel data bus, a wireless data input, a memory location from which image data 14 may be accessed, an interface which receives image data 14 from some data communication channel, hardware for retrieving image data 14 from a medium, such as a DVD, CD-ROM, flash memory, or other data record, or the like.

Image data 14 comprises pixel data 15 for pixels in an image to be displayed. Each set of pixel data 15 comprises a number of color coordinates, in this example C1, C2, and C3, which indicate the color and tone for a pixel. Pixel data 15 also includes either explicitly or implicitly location information, in this example identified by the coordinates X and Y, for a pixel represented by pixel data 15. Location information X, Y may be represented by an offset other relative location within image data 14 of a particular pixel data 15. In the example embodiment shown in FIG. 1A, location information X and Y are shown explicitly.

Apparatus 10 optionally includes a coordinate transform block 16 which transforms coordinates C1, C2, and C3 into a color space different from a color space of image data 14. In some embodiments, it is convenient for apparatus 10 to work internally in a different color space. The different color space may be, for example, a linear color space (i.e. a color space in which a physical value such as brightness (e.g., lightness or intensity or luminance) is represented linearly). In such embodiments, coordinate transform block 16 may perform a translation into a linear color space. In certain embodiments, coordinate transform block 16 may perform a translation into IPT, LAB or RGB color space or another color space which is more suitable for tone or gamut mapping than the color space of image data 14.

Block 18 receives pixel data 15 and performs a mapping of the pixel data 15 to mapped pixel data 15'. The mapping may be performed through use of lookup tables, logic circuits which execute mapping algorithms, or the like. The particular mapping performed is specified by mapping parameters 20 which influence the operation of mapping logic 19.

Mapped pixel data 15' is output as mapped image data 14'. Output of mapped image data 14' may comprise, for example, placing mapped pixel data 15' into a file or buffer, onto a serial or parallel data bus, transmitting the mapped pixel data 15' supplying the mapped pixel data 15' to a downstream device or circuit or the like.

In the illustrated embodiment, mapping parameters 20 include parameters 22 set by a configuration mechanism 26. Configuration mechanism 26 sets mapping parameters 22 according to metadata received from a metadata extraction/reception unit 24. In some embodiments, metadata is embedded in a signal, data structure, or other representation of image data 14 and is extracted by metadata extraction/reception unit 24 from the image data 14. In other embodiments, metadata is received on a separate channel, in a separate data structure, or the like. In any event, the operation of mapping logic 19 is controlled by parameters 22 which may be set or selected, at least in part, in response to metadata.

In the illustrated embodiment, parameters 22 include general parameters 22A, color parameters 22B, and location parameters 22C. In this embodiment, the mapping performed by mapping logic 19 may vary depending upon the color coordinates represented in a pixel data 15 being mapped and/or the location information corresponding to the pixel 15 being mapped. Example applications of these capabilities are described below.

In an example embodiment, metadata 21 supplied to configuration unit 26 includes general metadata to be applied to all of or selected portions of video data 14. For example, the general metadata may be specified for selected scenes or frames within video data 14. Configuration unit 26 may be configured to establish (for example by selection or calculation) a set of mapping parameters 22 to use for mapping the image data 14 based upon that general configuration metadata. The general configuration metadata may be specific to a particular display or image reproduction technology within which apparatus 10 is embedded or which is downstream from apparatus 10.

Metadata presented to configuration unit 26 may also include metadata which specifies particular mapping behaviour for particular colors or color ranges. For example, the metadata may specify one or more reserved colors or reserved ranges of color which should not be affected by the transformation of block 18. Such reserved colors or ranges may be specified in parameters 22B. Mapping logic 19 may be configured to make transformations in such a manner that reserved colors identified in parameters 22B are not changed by the transformation.

As another example, in some embodiments, the mapping specified by mapping parameters 22 may have the capability of mapping at least some colors to transformed colors outside of a gamut represented in image data 14. In some embodiments, colors within a range of colors lying close to the boundary of gamut 14 may be subjected to a transformation which is different from a transformation applied to colors that are at color coordinates far from the boundary of the gamut in which image data 14 is represented.

As another example, one or more selected colors from image data 14 may be associated with corresponding target colors outside of the gamut of image data 14. In such cases, mapping logic 19 may be configured to map the selected colors toward the corresponding target colors to a color that is within the display capabilities of the display or other target device.

Figure 5A:
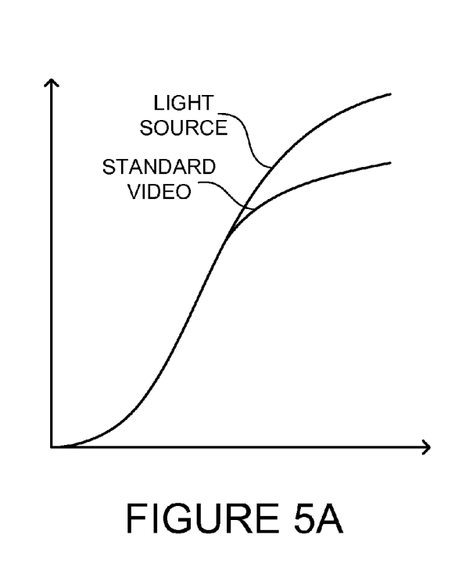
FIG. 5A is a graph of tone curves for standard video data and for an area of an image where there is a light source.

Mapping logic 19 may also be configured to perform different transformations depending upon the location information corresponding to pixel data (e.g. on the coordinates X, Y in the illustrated example). For example, metadata received by configuration unit 26 may specify the locations of light sources within a current image. Different mappings may be applied depending upon whether or not the location information corresponding to pixel data being processed indicates that the pixel data corresponds to a location which is in a light source or outside of a light source. Different mappings may be applied by adjusting the tone curves. For example, FIG. 5A illustrates a tone curve for standard video data (without any adjustments for light sources) and a tone curve adjusted for an area identified as a light source (the "adjusted tone curve"). To ensure seamless adjustment, the adjusted tone curve may be matched to the tone curve for standard video data at the boundary between light source and non-light source areas. For example, as seen in FIG. 5A, toward the lower input pixel drive values (e.g. corresponding to areas outside of the area identified as the light source), the adjusted tone curve may be the same as the tone curve of the standard video data. At some value between the lower input pixel drive values and the upper input pixel drive values, the adjusted tone curve diverges from the tone curve of the standard video data. The adjusted tone curve may differ from the tone curve of the standard video data for the upper input pixel drive values, which may correspond to the area identified as the light source (e.g. upper input pixel drive values may be mapped to output values higher than for standard video data, as shown in FIG. 5A). At the upper input drive values, the adjusted tone curve defines the intensity of the pixels in the area identified as the light source. The adjusted tone curve of FIG. 5A shows how the intensity of pixels in the light source area may be adjusted, for one example embodiment. In other embodiments, the adjusted tone curve may be a different curve than shown in FIG. 5A (e.g. the adjusted tone curve may have a particular inflection point which may be positioned up or down the curve, for various embodiments). Depending on the desired effect, a particular adjusted tone curve may be applied to an image to affect how the intensity of the light source area of the image is adjusted, relative to other areas of the image.

Figure 5B:
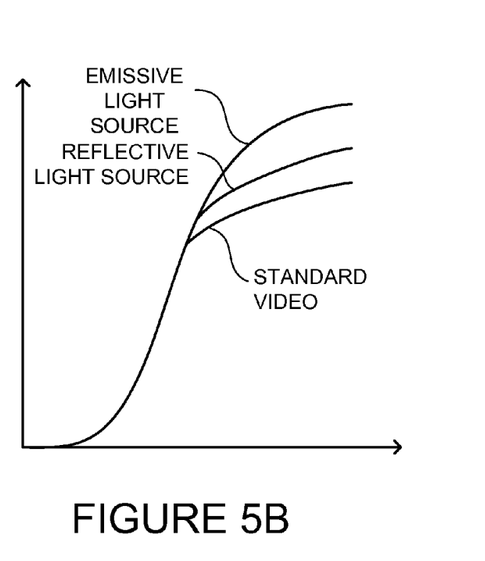
FIG. 5B is a graph of tone curves for standard video data and for areas of an image where there are emissive and reflective light sources.

In some embodiments, different mappings are applied depending upon the type of light source. For example, different mappings may be applied depending upon whether the light source is identified in the metadata as being a reflective light source or an emissive light source. In some embodiments, separate mapping algorithms and/or mapping parameters are provided for each of a plurality of different types of light sources. FIG. 5B illustrates example tone curves to be applied for areas identified as having emissive and reflective light sources and a tone curve for standard video data (without any adjustments for the light sources).

FIG. 1B illustrates components of apparatus 10 that may be located at the color grading tool. At the color grading tool, apparatus 10 receives input image data 14A at input 12A and outputs color graded image data 14B (which may include metadata 21). Image data 14A, 14B may comprise video data, data specifying one or more still images or the like. Image data 14A may comprise pixel data 15A for pixels in an image to be displayed. The color grading tool may comprise a color grading processor 11, which receives pixel data 15A and executes one or more color grading functions in response to user input so as to result in color graded pixel data 15B. Color grading functions may be implemented by software and/or hardware. Operation of color grading functions by processor 11 may be controlled by a professional color grader. For example, the color grader may decide to intensify certain colors, or alter luminance, saturation and/or hue of pixels in an image, and may provide appropriate user inputs to the color grading tool to cause selected color grading functions of the color grading tool to be applied to the pixel data 15A, so as to achieve the desired artistic effect.

In the illustrated embodiment, color grading processor 11 is communicatively coupled to a metadata generator 17. Metadata generator 17 may have access to, or may generate, a set of metadata definitions 13 which may describe tone/gamut parameters. Metadata generator 17 may have access to color graded pixel data 15B. Metadata generator 17 may generate metadata 21 for transmission with the color graded pixel data 15B. Metadata generation may be based on image characteristics and adjustments to the pixel data by color grading processor 11 as communicated by color grading processor 11 and/or determined from color graded pixel data 15B. Metadata generator 17 may identify parameters of the color graded pixel data to drive metadata creation.

In the illustrated embodiment, metadata generator 17 includes a program memory 23 for storing software functions, which when executed by a processor 27 of metadata generator 17, may identify parameters of the color graded pixel data such as, for example, locations of light sources in the image, colors which are intentionally color graded out of gamut, reserved colors, etc. Metadata generator 17 may use information about such parameters to generate metadata 21. Metadata 21 generated by metadata generator 17 may be combined with or transmitted with color graded pixel data 15B and output as image data 14B to a downstream device. In certain embodiments, components of apparatus 10 as shown in FIG. 1A may receive image data 14B (FIG. 1B) as image data 14.

Figure 8:
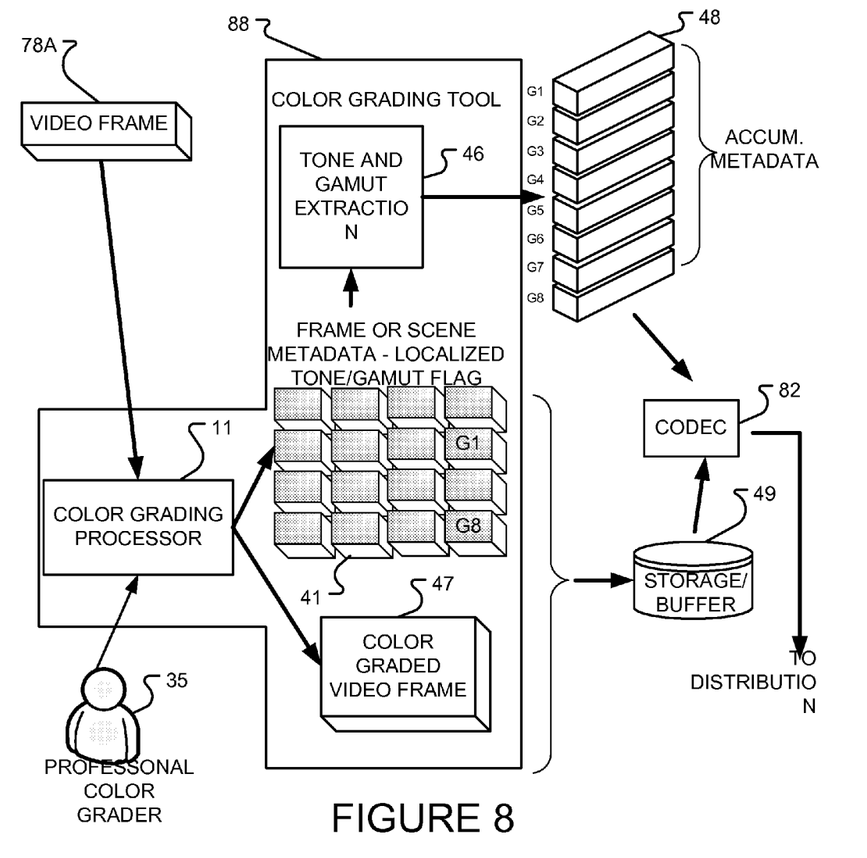
FIG. 8 schematically illustrates a color grading process according to one example embodiment.

FIG. 8 illustrates a color grading process according to an example embodiment. A professional color grader 35 starts the process by controlling a reference display to display video data from an external video content source; such video data may have been created through camera capture, CGI (computer generated imagery), etc. In the color grading process, while viewing the displayed video data on the reference display, the color grader 35 uses a color grading tool 88 to adjust or modify a video frame 78A (or a sequence of frames (i.e. scene)) according to the creator's artistic intent. Color grading processor 11 adjusts video frame 78A according to inputs from color grader 35 to produce color graded video frame 47.

In the color grading process, portions of each frame may be modified differently for: particular image areas (e.g. a particular tone mapping may be applied to an image area corresponding to a light source location); special colors (e.g. certain colors or tones/gamut may be mapped according to a color-specific mapping); and/or reserved colors (e.g. adjustment of skin tones, grass tones, and other tones designated as reserved colors in the color grading process may be inhibited during tone/gamut mapping). Within a frame or scene, localized tone or gamut flags may be set on a metadata grid 41 defining the location of particular pixels for which the tone/gamut has been adjusted in the color grading process; and/or the location of particular pixels for which tone/gamut has deliberately not been adjusted in the color grading process (e.g. as may be the case for reserved colors). The localized tone or gamut flag may identify information about the tone/gamut adjustment made to the pixel. Color graded video content, localized tone or gamut flags and pixel locations corresponding to each localized tone or gamut flag may be saved to a storage or buffer device 49. Localized tone or gamut flags and the information indicated by such flags may be saved into a frame metadata container 48 as accumulated localized metadata.

A codec 82 receives the metadata stored in metadata container 48, and color graded content in video frame 47 and local tone/gamut adjustments (as stored in storage device 49), encodes the metadata and color graded content for distribution. Methods for encoding by codec 82 may include, for example:

Encoding accumulated localized metadata and placing into metadata at the start of the video picture or scene. The video and frame metadata may be encoded and may follow the accumulated metadata. The frame metadata may be formatted to index the accumulated localized metadata to minimize the amount of data required to transmit the metadata.

Ignoring the accumulated metadata and encoding the frame metadata along with the color graded video (this may increase overall bandwidth).

Figure 7:
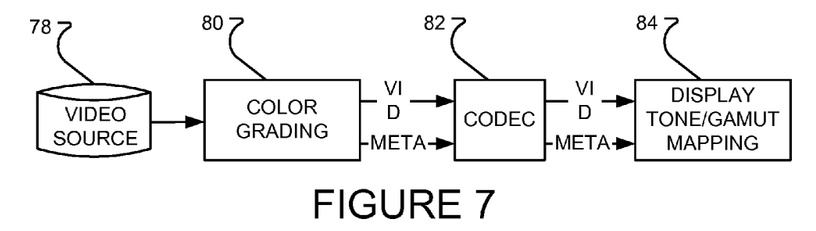
FIG. 7 is a flow chart illustrating the delivery of video data and metadata through a portion of a video delivery pipeline.

FIG. 7 illustrates a portion of a video delivery pipeline which begins with color grading stage 80 and ends with display tone/gamut mapping stage 84. Other stages preceding or succeeding either of stages 80, 84 of the video delivery pipeline are not shown. Components of apparatus 10 shown in FIG. 1B and/or color grading tool shown in FIG. 8 may be used at the color grading stage 80 to generate metadata for tone/gamut mapping purposes at downstream devices. The metadata may be delivered along with video data to a codec stage 82 for encoding and/or decoding the video data and metadata. In some embodiments, the metadata may be delivered by a separate communication channel. The video data and metadata are delivered to a downstream device for tone/gamut mapping at stage 84. Components of apparatus 10 shown in FIG. 1A may be used at tone/gamut mapping stage 84 to implement the tone/gamut mapping methods described herein.

Figure 2A:
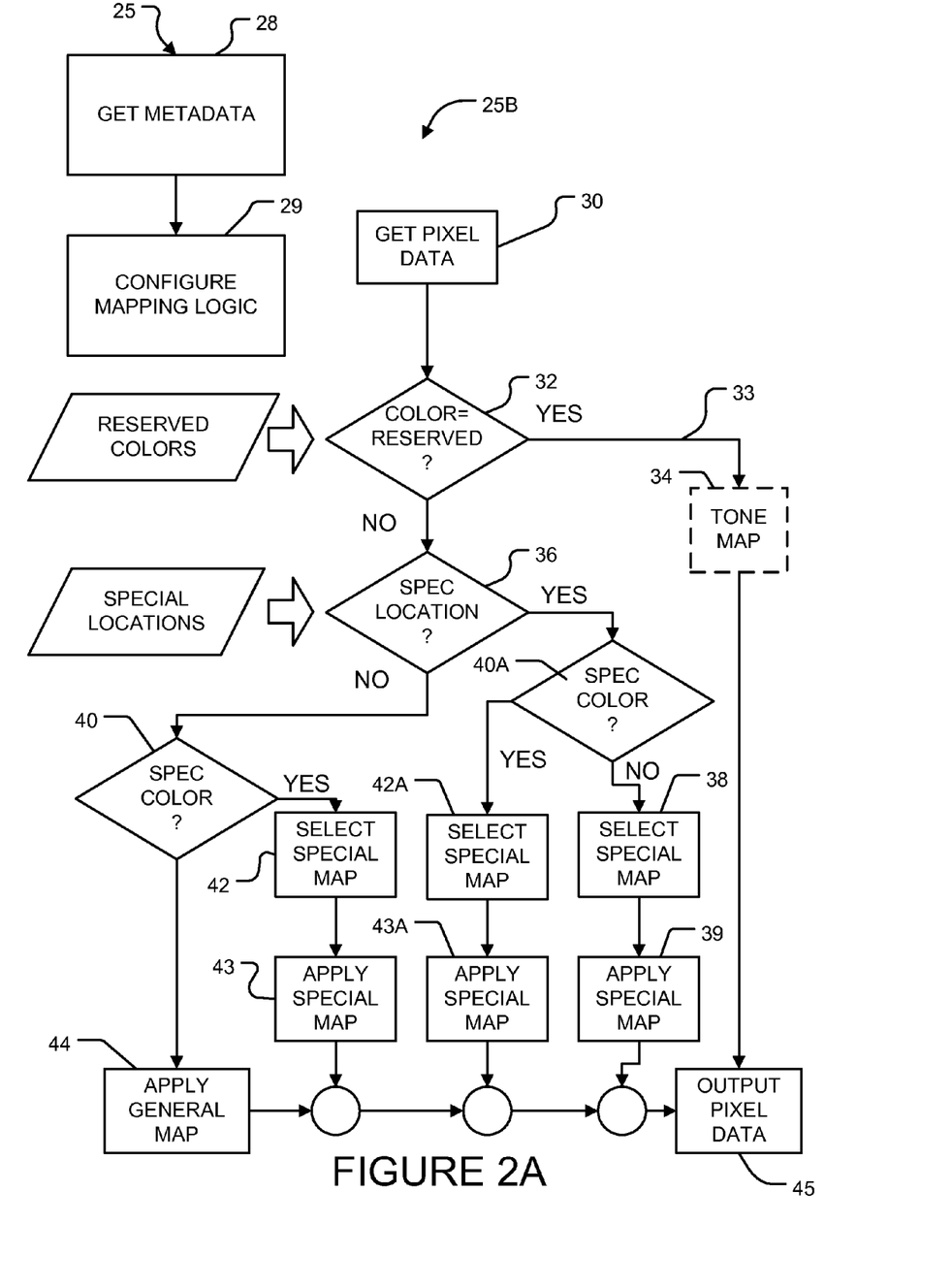
FIG. 2A is a flow chart illustrating a method according to an example embodiment.

FIG. 2A illustrates a method 25 which may be applied to mapping image data 14 to mapped image data 14'. In block 28, metadata is obtained. The metadata may be extracted from a video stream, a file containing video data, a separate data structure, received on a separate data stream, or the like. Metadata may be obtained prior to and/or during obtaining image data. Block 28 may be performed continuously during processing of image data in some embodiments.

In block 29, mapping logic is configured in response to received metadata. The configuration may include, for example, writing values to lookup tables used for mapping color values and/or tone values; recording reserved colors, identifying special color ranges having separate mappings, or modified mappings; identifying special locations having specific mappings or modified mappings; writing parameter values to registers accessed by mapping algorithms; configuring configurable logic implement mapping algorithms or the like. Block 29 may be repeated each time updated metadata is received.

Metadata may include metadata that affects the manner in which color/luminance values for pixel data are shown on a display or the manner in which mapping is performed from the transmitted color/luminance values to the mapped color/luminance values (in either the same or a different color space). Metadata may also include metadata that assists in abbreviating metadata or reducing the amount of data required to transmit metadata. For example, in some embodiments, the metadata may define tone/gamut maps for later use in tone/gamut mapping. Subsequent metadata may indicate that for certain pixels, one of the predefined gamut maps is to be used. The predefined maps may be stored or buffered at the display end of a video delivery pipeline in a data structure that may be referenced by the mapping apparatus. The data structure may be, for example, a one-dimensional or two-dimensional data structure.

Figure 6:
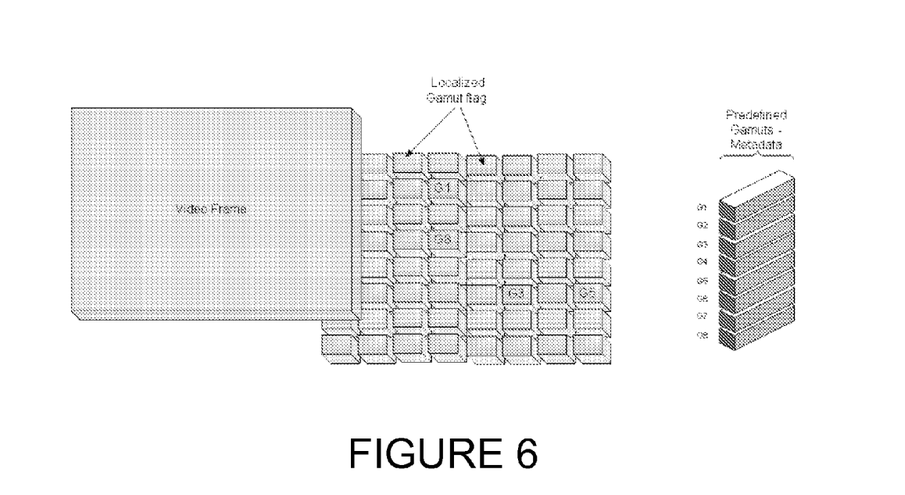
FIG. 6 is an example representation of metadata which has been pre-defined to describe tone/gamut parameters.

In some embodiments, the metadata may define metadata flags providing information about tone or gamut adjustments made in the color grading process. Information about tone or gamut adjustments may identify, for example: colors that have not been adjusted because they are reserved colors; colors that have been deliberately color graded out-of-gamut; special colors to be mapped according to a color-specific map, etc. The metadata flags and corresponding tone or gamut adjustment information may be stored in a data structure (e.g. a look-up table) that may be stored or buffered at the display end and later referenced by the mapping apparatus (e.g. see FIG. 6 showing localized tone or gamut flags set at pixels on a metadata grid corresponding to a frame of image data, and a predefined gamut metadata structure). Subsequent metadata transmitted to the display end may indicate that particular localized tone or gamut flags correspond to certain pixels in the pixel data. Such information may in turn be used by the mapping apparatus to look up in the stored metadata structure the tone or gamut adjustments made to those pixels, and to select and apply a tone/gamut mapping method based on such tone or gamut adjustments.

Method 25 includes a data processing sequence 25B which performs mappings of pixel data. Sequence 25B may be repeated for each pixel data 15 in image data 14. In block 30, pixel data is received. Block 30 may, for example, comprise retrieving a next pixel data from a buffer; retrieving pixel data from a memory; receiving pixel data on an input line such as a parallel or serial bus; or the like. In block 32 the color coordinates of the pixel data are compared to a set of zero or more reserved colors. If there are no reserved colors then block 32 is optional and need not be performed. If the color coordinates of the pixel data being processed correspond to a reserved color, then either the pixel data is passed through unmapped as indicated by path 33, or, the pixel data is passed through block 34 which performs mapping of the tone of the pixel data only (for example, block 34 may expand a dynamic range of the pixel data or otherwise change a luminance value of the pixel data to suit a downstream application). In certain embodiments, the tone is preserved for pixels that represent particular objects or areas of the image (e.g. pixels representing skin, grass, sky, etc.). Accordingly, reserved colors may correspond to those used to depict such objects. Reserved colors may be set by a color grader at the color grading stage (e.g. the color grader may designate certain tones as skin tones). During mapping of the pixel data, tones that are within a predetermined margin of the reserved colors may be preserved.

In block 36, location information corresponding to the pixel data is compared to a set of zero or more special locations. If no special locations have been specified by metadata, then block 36 is optional and need not be performed. Where special locations have been identified then block 36 determines whether the location information for the pixel data corresponds to a special location and, if so, makes active a location-specific mapping for the pixel data in block 38.

In some embodiments, special locations may be associated with different types of mapping algorithms. For example, different mapping algorithms (or different variations of a mapping algorithm) may be provided for different types of light source. For example, different mapping algorithms may be provided for light emissive objects and for reflective objects. In some embodiments, pixel data 15 is mapped according to: a default algorithm; an algorithm for emissive objects; or an algorithm for reflective objects depending upon position-specific metadata for the pixel to which the pixel data 15 relates. In such embodiments, block 38 may comprise selection from among a plurality of algorithms.

In block 39 the location specific mapping is applied to the pixel data to obtain mapped pixel data.

In block 40 the color coordinates of the pixel data (which may include a tone or luminance value) are compared to a set of zero or more special color regions. The special color regions may consist of single points in color space or regions in the color space. If no special colors have been specified, then block 40 is optional and may be omitted. If the color coordinates of the pixel data correspond to a special region of the color space then in block 42 a color-specific map is selected. In block 43 the color-specific map is applied to map the pixel data to mapped pixel data.

In block 44, pixel data which does not correspond to a reserved color, a special location, or a special color is mapped according to a general mapping. In block 45, mapped pixel data is output. Block 45 may comprise, for example, placing mapped pixel data onto a serial or parallel data bus, sending mapped pixel data across a wired or wireless communication channel, applying mapped pixel data to further image processing displaying or reproduction hardware, writing mapped pixel data to a memory, or the like.

In some embodiments, the metadata includes an image histogram or other image statistics. A mapping algorithm may use this information, for example an average luminance of a current image to control tone and/or gamut mapping. In some embodiments the image statistics are available to data processing sequence 25B before pixel data for the current image is mapped. This can permit mapping of pixel data to be based on statistics for an image even where the mapping is commenced before all data for the image is received. In some embodiments mapping is local (i.e. each set of pixel data 15 is mapped without regard to the values of pixel data 15 for other pixels in the image).

The image histogram that is provided by metadata for a frame of image data may identify, for example, the number of pixels for each color channel having a luminance value within a luminance range associated with each one of the histogram buckets (e.g. 256 24-bit histogram buckets may be provided for each color channel). The image histogram(s) and/or image statistics may be used to analyze the image data. Tone/gamut mapping may be performed based on such image data analysis. For example, in some embodiments, a special tone/gamut mapping algorithm may be performed based on an assessment of brightness or dimness of the overall image, or the significance of bright or dim areas relative to average luminance, or other criteria as extracted from the histogram or image statistics. In some embodiments, tone/gamut mapping may comprise, for example, achieving a balance between bright and dim image areas by: adjusting the tone curve to be applied so that less emphasis is placed on objects in the bright image areas, or adjusting the tone curve to be applied so that more emphasis is placed on objects in dim image areas.

In some embodiments, general metadata includes information specifying a selected mode of operation for a tone/gamut mapping apparatus. This feature may be exploited, for example, to allow a director to exert control over the tone/gamut mapping algorithm(s) applied at a television or other downstream device, if the implementation of the mapping algorithm(s) are standardized for the upstream and downstream devices. In some embodiments the selected mode of operation is identified by a code indicating generally the nature of the mode. For example, some televisions which incorporate tone/gamut mapping apparatus as described herein may support selection among "vivid", "cinema", "standard" and "pro" modes. Different televisions may implement supported modes in their own ways.

Figure 3:
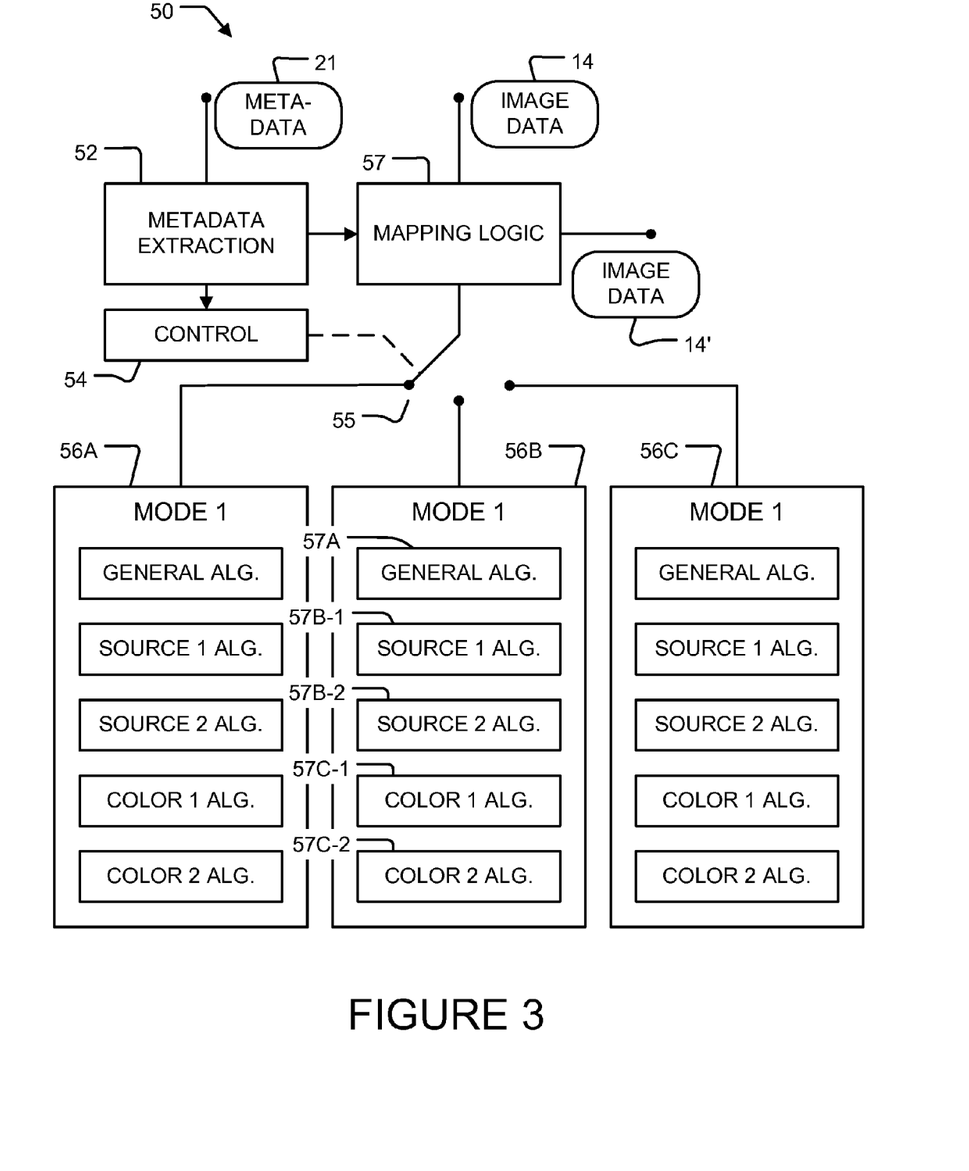
FIG. 3 is a block diagram illustrating apparatus according to another example embodiment.

FIG. 3 shows apparatus 50 according to another example embodiment. Apparatus 50 comprises a metadata extractor 52 that reads metadata 21 from image data 14 or some other source. A control 54 controls a switch 55 in response to the detected metadata. For example, control 54 may set the position of switch 55 in response to a desired mode indicated by metadata 21.

Switch 55 may comprise a physical switch or a logical switch. For each position of switch 55 a different set 56 of mapping algorithms is made available to mapping logic 57. The illustrated embodiment provides sets 56A, 56B and 56C (collectively sets 56). Each set 56 comprises, for example, a general algorithm 57A, a plurality of algorithms for different specific types of light sources 57B-1, 57B-2, and a plurality of algorithms for specific colors or color regions 57C-1, 57C-2.

In some embodiments, televisions or other downstream devices may incorporate tone/gamut mapping apparatus configured to receive specification for a mapping algorithm to be applied to video data 14. The specification may be of certain mapping parameters such as look-up table values, parameters which control some aspect of operation of tone and/or gamut mapping algorithm(s) implemented by the apparatus, or specification of one or more special algorithms to be executed by the apparatus in mapping tone and/or gamut of image data 14. The look-up tables can be set upon initialization, and metadata may be used to index through the look-up tables to select the desired tone/gamut mapping. Initialization may be performed with a fixed set of data (which may include data that is not built in at the receiving end but is supplied by the user) or through the transmission of metadata.

Table 1 provides an illustration of some examples of position-specific metadata codes that may be used in the context of this invention. The codes shown in Table 1 are examples only.

TABLE I

EXAMPLE POSITION-SPECIFIC METADATA CODES

| CODE | MEANING | NOTE |
|---|---|---|
| 0000 | default mapping | |
| 0001 | reflective object | |
| 0010 | emissive object | |
| 1101 | reflective object of a reserved color | |
| 1110 | emissive object of a reserved color | |

Table II provides an illustration of some examples of color-specific metadata codes that may be used in the context of this invention. The codes shown in Table II are examples only.

TABLE II

EXAMPLE COLOR-SPECIFIC METADATA CODES

| CODE | MEANING | NOTE |
|---|---|---|
| 0011 | color graded out of gamut | indicates color is intentionally out of gamut of a reference display used in color grading |
| 0100 | reserved color #1 | the reserved colors may be specified, for example, as 60-bit representations of the CIE XYZ coordinates in a CIE LAB color space (20 bits per coordinate). |
| 0101 | reserved color #2 | |
| 0110 | reserved color #3 | |
| 0111 | reserved color #4 | |

Table III provides an illustration of some examples of general metadata information that may be used in the context of this invention. The information items shown in Table III are examples only.

TABLE III

EXAMPLE GENERAL METADATA INFORMATION

| CODE | MEANING | NOTE |
|---|---|---|
| Image Histogram | Histogram illustrates the number of pixels for each color channel coming within ranges associated with histogram buckets. | For example, 256 24-bit histogram buckets may be provided for each color channel. |
| Director Selected Mode | Permits control of tone/gamut mapping modes of a downstream display device (e.g. selection among "vivid", "cinema", "standard" and "pro" modes) | |
| Content source | Values specify, e.g. whether the image data is camera direct or color graded. | |

The order of operations in method 25 may be altered. For example, determination of whether a piece of pixel data being processed corresponds to a special location may be performed after determining whether the pixel data corresponds to a special region in color space. In a further example embodiment, shown in FIG. 2A, if a pixel data is identified as corresponding to a special location, then a block 40A is performed to determine whether the pixel data also corresponds to a special point or region in color space. If so, then a map that is both location-specific and color-specific is selected in block 42A and this map is then applied to map the color coordinates for the pixel in block 43A.

In an example application, a video signal has been color graded to be displayed on a "standard color television". However, the video signal will be displayed on a television having a gamut that is broader than that of the standard television and also has a greater dynamic range than the standard television. In this application, it may be desirable to slightly boost the dynamic range of the input video data and then slightly expand the gamut of the input video data in order to take advantage of the capabilities of the display. A default mapping which provides suitable expansion of dynamic range and gamut is provided, for example, in the form of a set of lookup tables. To facilitate this, the image data may be presented or transformed into a color space which includes hue and lightness coordinates.

During color grading, certain colors, such as, for example, a range of colors that appear in flesh of people depicted in the video, are identified as being reserved colors. The metadata identifies these reserved colors so that the mapping will not alter the flesh tones. Additionally, either in the preparation of the video content or at a subsequent location upstream from a mapping apparatus, the video images are processed to locate light sources within the images. Metadata identifying locations of those light sources (and, in some cases, types of the light sources) is generated.

Pixel location information is compared to the locations of light sources. If a pixel data being processed corresponds to the location of a light source, then a different mapping may be applied. In some embodiments, the selected mapping for locations corresponding to light sources expands dynamic range more aggressively than mappings applied to areas that are not identified as corresponding to light sources.

Figure 4:
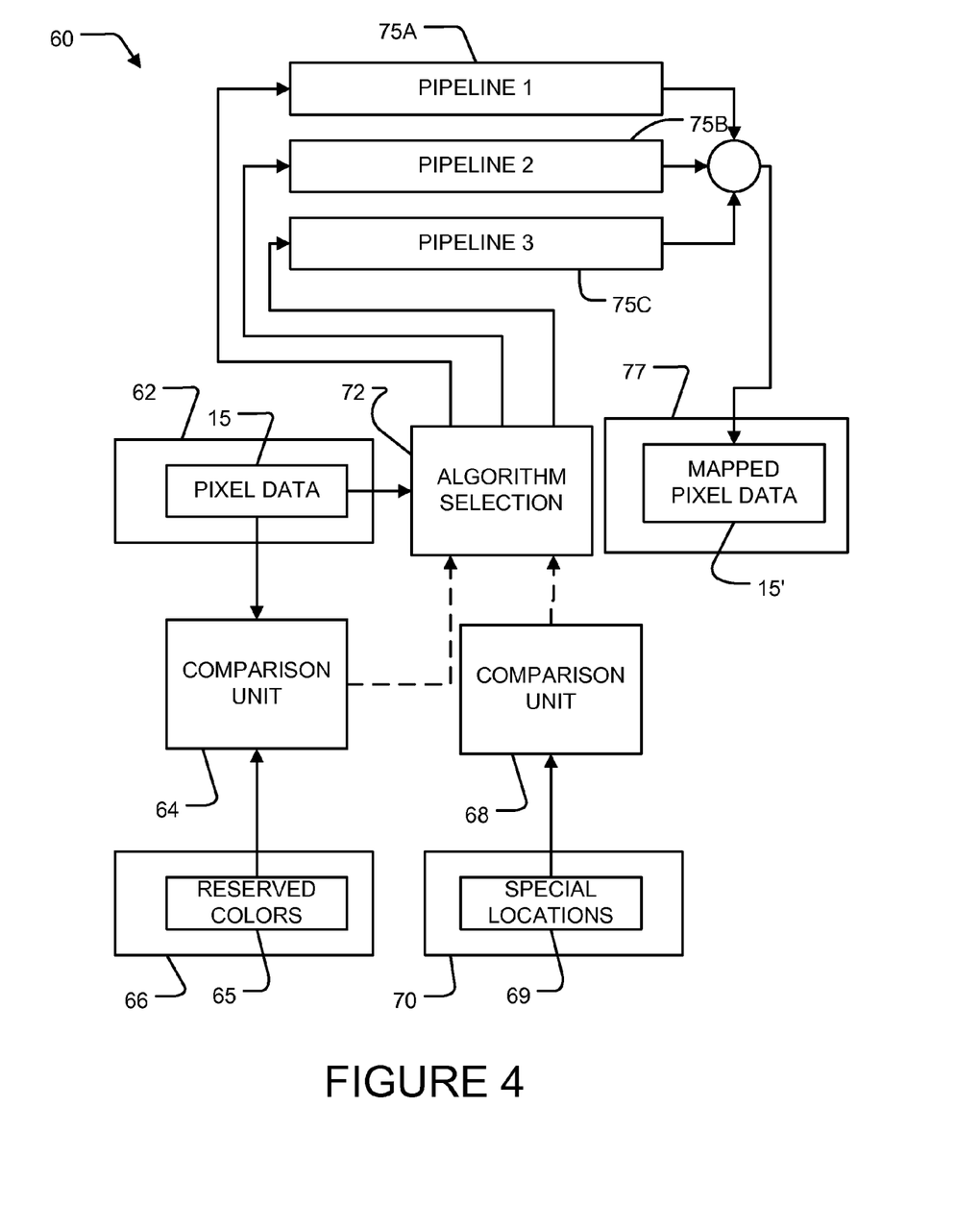
FIG. 4 is a block diagram illustrating apparatus according to another example embodiment.

FIG. 4 illustrates mapping logic 60 according to an example embodiment. Pixel data 15 being mapped is received in a buffer or memory 62. A comparison unit 64 compares color coordinates of pixel data 15 to a set of reserved color coordinates 65 in a buffer or memory 66. A second comparison unit 68 compares location information of the pixel data to a set of special locations 69 in a buffer or memory 70. Algorithm selection logic 72 selects an appropriate mapping algorithm for the pixel data based on outputs of comparison units 64 and 68. The illustrated embodiment has several parallel mapping pipelines 75 each configured to execute a different mapping algorithm. Algorithm selection logic 72 determines which one of pipelines 75 will be used to process the pixel data 15. Mapped pixel data 15' is written to a memory or buffer 77.

Selection among pipelines 75 may be achieved in any suitable manner. Some examples are:
  selectively enabling one of pipelines 75;
  applying pixel data 15 only to a selected pipeline 75;
  selecting the output of one pipeline 75 from which to write mapped pixel data 15'. As a further alternative, algorithm selection unit 72 may be configured to reconfigure a programmable or otherwise configurable logic pipeline on the fly to perform a mapping algorithm corresponding to the outputs of comparison units 64 and 68. Comparison units 64 and 68 may have but are not limited to having two-state outputs. In some embodiments, outputs of one or both comparison units 64 and 68 can have three or more states.

Some specific ways in which the methods and apparatus according to this invention may be made available include:
  image processing chips comprising apparatus according to an embodiment of the invention;
  a set-top box, television, computer monitor, projector and/or other display incorporating tone and/or gamut mapping apparatus as described herein;
  an image data source such as a DVD player (e.g. Blu-Ray player), video player, camera, mobile phone or the like incorporating tone and/or gamut mapping apparatus as described herein;
  physical or non-transitory computer-readable media comprising firmware or other computer-readable instructions which, when executed, configure a programmable processor and/or configurable logic apparatus to perform a method according to the invention;
  one or more central processing units (CPUs), one or more microprocessors, one or more field programmable gate arrays (FPGAs), one or more application-specific integrated circuits (ASICs), one or more graphics processing units (GPUs), or any combination thereof, or any other suitable processing unit(s) comprising hardware and/or software capable of performing a method according to the invention; and,
  color grading tools incorporating tone and/or gamut mapping apparatus as described herein.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope. It is therefore intended that the following appended claims and claims hereafter introduced are interpreted to include all such modifications, permutations, additions and sub-combinations as are within their true spirit and scope.

Accordingly the invention may suitably comprise, consist of, or consist essentially of, any of element (the various parts or features of the invention and their equivalents as described herein, currently existing, and/or as subsequently developed. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

Accordingly, the invention may be embodied in any of the forms described herein, including, but not limited to the following Enumerated Example Embodiments (EEEs) which described structure, features, and functionality of some portions of the present invention.

EEE1. A method for mapping pixel data, the method comprising comparing location information corresponding to the pixel data to a set of one or more special locations and, in response to the location information matching one of the set of one or more special locations, performing one or both of tone and gamut mapping the pixel data according to a special mapping algorithm.

EEE2. A method according to EEE 1 comprising comparing color coordinates for the pixel data to a set of one or more reserved colors and, in response to the color coordinates matching one of the set of reserved colors, inhibiting gamut mapping of the pixel data.

EEE3. A method according to EEE 1 comprising comparing color coordinates of the pixel data to a set of one or more special color regions and, in response to the color coordinates corresponding to one of the set of special color regions, selecting a color-specific map and mapping the pixel data according to the color-specific map.

EEE4. A method according to EEE 1 comprising receiving and storing metadata comprising information specifying the set of one or more special locations.

EEE5. A method according to EEE 2 comprising receiving and storing metadata comprising information specifying the set of one or more reserved colors.

EEE6. A method according to EEE 3 comprising receiving and storing metadata comprising information specifying the set of one or more special color regions.

EEE7. A method according to any one of EEEs 4 to 6 wherein receiving the metadata comprises extracting the metadata from a signal or file containing the pixel data.

EEE8. A method according to EEE 1 wherein the special locations comprise special locations of a plurality of types and the method comprises selecting the special mapping algorithm from a plurality of predetermined special algorithms based upon the type of the special location matched by the location information.

EEE9. A method according to EEE 8 wherein the type of the special location comprises one of: emissive light source and reflective light source.

EEE10. A method according to any one of EEEs 1 to 9, the method comprising:
receiving statistical information regarding luminance or chrominance values of the pixel data; and
mapping the pixel data to mapped pixel data by a mapping based in part on the statistical information.

EEE11. A method according to EEE 10 wherein the statistical information comprises a histogram of the number of pixels for each color channel having a luminance value within a luminance range associated with one of a plurality of predefined histogram buckets.

EEE12. Image processing apparatus comprising:
a plurality of parallel pipelines each configured to map pixel data to mapped pixel data according to a corresponding mapping algorithm;
algorithm selection logic configured to select one of the plurality of pipelines for mapping specific pixel data based at least in part on location information corresponding to the specific pixel data.

EEE13. Image processing apparatus according to EEE 12 comprising a buffer or memory containing a set of special locations and a first comparison unit configured to compare the location information of the pixel data to locations in the set of special locations wherein the algorithm selection logic is configured to select the one of the plurality of pipelines based at least in part on an output of the first comparison unit.

EEE14. Image processing apparatus according to EEE 13 comprising a buffer or memory containing information specifying one or more special colors and a second comparison unit configured to compare color coordinates of the pixel data to the set of special colors, wherein the algorithm selection logic is configured to select the one of the plurality of pipelines based at least in part on an output of the second comparison unit.

EEE15. A method for mapping tone, gamut or both tone and gamut of pixel data in image data, the method comprising:
receiving pixel data for an image at a mapping apparatus;
receiving metadata at the mapping apparatus, the metadata comprising one or more of:
information specifying a set of one or more special locations;
information specifying a set of one or more reserved colors; and
information specifying a set of one or more special color regions; and
mapping the pixel data to mapped pixel data according to an algorithm based at least in part on mapping parameters determined from the metadata.

EEE16. A method according to EEE 15 wherein the metadata comprises information specifying a set of one or more special locations, the method comprising: comparing location information corresponding to the pixel data to the set of one or more special locations and, in response to the location information matching one of the set of one or more special locations, performing one or both of tone and gamut mapping the pixel data according to a special mapping algorithm.

EEE17. A method according to EEE 16 wherein the metadata comprises information specifying a set of one or more reserved colors, the method comprising: comparing color coordinates for the pixel data to the set of one or more reserved colors and, in response to the color coordinates matching one of the set of reserved colors, inhibiting gamut mapping of the pixel data.

EEE18. A method according to EEE 17 wherein the metadata comprises information specifying a set of one or more special color regions, the method comprising: comparing color coordinates of the pixel data to the set of one or more special color regions and, in response to the color coordinates corresponding to one of the set of special color regions, selecting a color-specific map and mapping the pixel data according to the color-specific map.

EEE19. A method according to EEE 18 wherein the metadata comprises a histogram of the number of pixels for each color channel having a luminance value within a luminance range associated with one of a plurality of predefined histogram buckets, the method comprising:
analysing the histogram to assess the brightness or dimness of the image; and generating a tone curve for mapping the pixel data based at least in part on the assessment of the brightness or dimness of the image.

EEE20. A method according to EEE 19 wherein receiving the metadata comprises extracting the metadata from a signal or file containing the pixel data.

EEE21. A method according to EEE 16 wherein the special locations comprise special locations of a plurality of types and the method comprises selecting the special mapping algorithm from a plurality of predetermined special algorithms based upon the type of the special location matched by the location information.

EEE22. A method according to EEE 21 wherein the type of the special location comprises one of: emissive light source and reflective light source.

EEE23. A method according to EEE 15, comprising:
generating the metadata based at least in part on tone or gamut parameters for the pixel data as adjusted by a color grader; and
encoding the metadata in image data for transmission to the mapping apparatus.

EEE24. A method according to EEE 23, wherein generating the metadata comprises defining localized metadata definitions for a frame or scene, the method comprising delivering the localized metadata definitions to the mapping apparatus in advance of image data for the frame or scene.

EEE25. A method according to EEE 24 wherein receiving the metadata comprises extracting the metadata from the image data containing the pixel data.

EEE26. An apparatus for mapping tone, gamut or both tone and gamut of pixel data in image data, the apparatus comprising:
a metadata extraction unit configured to extract metadata from image data;
a configuration unit configured to receive the extracted metadata and to generate a set of mapping parameters based at least in part on the extracted metadata, wherein the mapping parameters comprise one or more of: location parameters and color parameters; and
a mapping unit configured to receive the set of mapping parameters and pixel data in image data for an image, and to map the pixel data to mapped pixel data based at least in part on the set of mapping parameters.

EEE27. An apparatus according to EEE 26, wherein the mapping unit is configured to compare location information corresponding to the pixel data to a set of one or more special locations as defined in the location parameters, and, in response to the location information matching one of the set of one or more special locations, performing one or both of tone and gamut mapping the pixel data according to a special mapping algorithm.

EEE28. An apparatus according to EEE 27, wherein the mapping unit is configured to compare color coordinates for the pixel data to a set of one or more reserved colors as defined in the color parameters, and, in response to the color coordinates matching one of the set of reserved colors, inhibiting gamut mapping of the pixel data.

EEE29. An apparatus according to EEE 28, wherein the mapping unit is configured to compare color coordinates of the pixel data to a set of one or more special color regions as defined in the color parameters, and, in response to the color coordinates corresponding to one of the set of special color regions, selecting a color-specific map and mapping the pixel data according to the color-specific map.

EEE30. An apparatus according to EEE 26, wherein the mapping parameters generated by the configuration unit comprise one or more of:
general configuration parameters specific to a display on which the image data is to be displayed;
statistical image parameters; and
parameters for a director's selected mode of operation.

The invention claimed is:

1. A method for mapping pixel data, the method comprising:
   comparing location information corresponding to the pixel data to a set of one or more special locations within an image frame, said special location being associated with a special mapping algorithm;
   comparing color coordinates for the pixel data to a set of one or more reserved colors, said reserved color being designated as not affected by mapping transformations;
   comparing color coordinates of the pixel data to a set of one or more special color regions, said special color region being associated with a color-specific mapping; and
      generating metadata based on tone or gamut parameters comprising the special locations, the reserved colors and the special color regions for the pixel data as adjusted by a color grader.

2. A method according to claim 1 comprising comparing color coordinates for the pixel data to a set of one or more reserved colors and, in response to the color coordinates matching one of the set of reserved colors, inhibiting gamut mapping of the pixel data.

3. A method according to claim 2 comprising receiving and storing metadata comprising information specifying the set of one or more reserved colors.

4. A method according to claim 3, wherein receiving the metadata comprises extracting the metadata from a signal or file containing the pixel data.

5. A method according to claim 2, the method further comprising the steps of:
   receiving statistical information regarding luminance or chrominance values of the pixel data; and
   mapping the pixel data to mapped pixel data by a mapping based in part on the statistical information.

6. A method according to claim 1 comprising comparing color coordinates of the pixel data to a set of one or more special color regions and, in response to the color coordinates corresponding to one of the set of special color regions, selecting a color-specific map and mapping the pixel data according to the color-specific map.

7. A method according to claim 6 comprising receiving and storing metadata comprising information specifying the set of one or more special color regions.

8. A method according to claim 7 wherein receiving the metadata comprises extracting the metadata from a signal or file containing the pixel data.

9. A method according to claim 8, the method further comprising the steps of:
   receiving statistical information regarding luminance or chrominance values of the pixel data; and
   mapping the pixel data to mapped pixel data by a mapping based in part on the statistical information.

10. A method according to claim 1 comprising receiving and storing metadata comprising information specifying the set of one or more special locations.

11. A method according to claim 10, wherein receiving the metadata comprises extracting the metadata from a signal or file containing the pixel data.

12. A method according to claim 1 wherein the special locations comprise special locations of a plurality of types and the method comprises selecting the special mapping algorithm from a plurality of predetermined special algorithms based upon the type of the special location matched by the location information.

13. A method according to claim 12 wherein the type of the special location comprises one of: emissive light source and reflective light source.

14. A method according to claim 1, the method comprising:
   receiving statistical information regarding luminance or chrominance values of the pixel data; and
   mapping the pixel data to mapped pixel data by a mapping based in part on the statistical information.

15. A method according to claim 14 wherein the statistical information comprises a histogram of the number of pixels for each color channel having a luminance value within a luminance range associated with one of a plurality of predefined histogram buckets.

16. A method according to claim 1 comprising:
   in response to the location information matching one of the set of one or more special locations, performing one or both of tone and gamut mapping the pixel data according to a special mapping algorithm.

17. Image processing apparatus comprising:
   a color grading processor configured to:
   receive pixel data for an image;
      generate metadata based on tone or gamut parameters selectable by a color grader; wherein the parameters comprise: one or more special locations within an image frame, said special location being associated with a special mapping algorithm; one or more reserved colors, said reserved color being designated as not affected by mapping transformations; and one or more special color regions, said special color region being associated with a color-specific mapping.

18. Image processing apparatus according to claim 17 comprising a buffer or memory containing a set of special locations and a first comparison unit configured to compare the location information of the pixel data to locations in the set of special locations.

19. Image processing apparatus according to claim 18 comprising a buffer or memory containing information specifying one or more special colors and a second comparison unit configured to compare color coordinates of the pixel data to the set of special colors.

20. Image processing apparatus according to claim 17 comprising:
- a plurality of parallel pipelines each configured to map pixel data to mapped pixel data according to a corresponding mapping algorithm;
  - algorithm selection logic configured to select one of the plurality of pipelines for mapping specific pixel data based at least in part on location information corresponding to the specific pixel data.

21. A method for mapping tone, gamut or both tone and gamut of pixel data in image data, the method comprising:
- receiving pixel data for an image at a mapping apparatus;
- receiving metadata at the mapping apparatus, the metadata comprising:
- information specifying a set of one or more special locations within an image frame, said special location being associated with a special mapping algorithm;
- information specifying a set of one or more reserved colors, said reserved color being designated as not affected by mapping transformations; and
- information specifying a set of one or more special color regions, said special color region being associated with a color-specific mapping;
- mapping the pixel data to mapped pixel data according to an algorithm based at least in part on mapping parameters determined from the metadata;
  - generating the metadata based on tone or gamut parameters for the pixel data as adjusted by a color grader.

22. A method according to claim 21, comprising:
- encoding the metadata in image data for transmission to the mapping apparatus.

* * * * *